United States Patent
Fujita et al.

(10) Patent No.: US 10,040,693 B2
(45) Date of Patent: Aug. 7, 2018

(54) PARTICLES FOR MONOLITHIC REFRACTORY

(71) Applicant: CoorsTek KK, Shinagawa-ku, Tokyo (JP)

(72) Inventors: Mitsuhiro Fujita, Hadano (JP); Shuko Akamine, Hadano (JP)

(73) Assignee: COORSTEK KK, Shinagawa-Ku, Tokyo (JP)

( * ) Notice: Subject to any disclaimer, the term of this patent is extended or adjusted under 35 U.S.C. 154(b) by 0 days.

(21) Appl. No.: 15/385,144

(22) Filed: Dec. 20, 2016

(65) Prior Publication Data

US 2017/0217781 A1    Aug. 3, 2017

(30) Foreign Application Priority Data

Jan. 29, 2016  (JP) .................................. 2016-015053

(51) Int. Cl.
| | | |
|---|---|---|
| *C01F 7/00* | (2006.01) | |
| *C01F 7/16* | (2006.01) | |
| *C04B 35/66* | (2006.01) | |
| *C04B 35/443* | (2006.01) | |
| *C04B 35/626* | (2006.01) | |
| *C04B 35/63* | (2006.01) | |

(52) U.S. Cl.
CPC ............ *C01F 7/162* (2013.01); *C04B 35/443* (2013.01); *C04B 35/6262* (2013.01); *C04B 35/6303* (2013.01); *C04B 35/66* (2013.01); *C01P 2002/32* (2013.01); *C01P 2004/53* (2013.01); *C01P 2004/61* (2013.01); *C01P 2006/11* (2013.01); *C01P 2006/14* (2013.01); *C01P 2006/16* (2013.01); *C01P 2006/32* (2013.01); *C04B 2235/3206* (2013.01); *C04B 2235/3217* (2013.01); *C04B 2235/5427* (2013.01); *C04B 2235/5436* (2013.01); *C04B 2235/5472* (2013.01); *C04B 2235/6027* (2013.01); *C04B 2235/763* (2013.01)

(58) Field of Classification Search
CPC ................................. C01F 7/162; C04B 35/66
USPC .......................................................... 423/600
See application file for complete search history.

(56) References Cited

U.S. PATENT DOCUMENTS

| | | | | |
|---|---|---|---|---|
| 2,805,167 A | * | 9/1957 | McCreight | C04B 35/01 423/600 |
| 3,304,153 A | * | 2/1967 | Lindsay | C01F 7/162 423/600 |
| 2008/0318761 A1 | * | 12/2008 | Riedel | C01B 13/34 501/134 |
| 2014/0112861 A1 | * | 4/2014 | Akamine | C01F 7/162 423/600 |
| 2015/0368118 A1 | * | 12/2015 | Akamine | C04B 38/0615 423/600 |
| 2016/0122249 A1 | * | 5/2016 | Soudier | C04B 35/443 501/109 |

FOREIGN PATENT DOCUMENTS

| | | |
|---|---|---|
| JP | 2002-187782 A | 7/2002 |
| JP | 2012-229139 A | 11/2012 |
| JP | 2013-209278 A | 10/2013 |
| JP | 205-000838 A | 1/2015 |
| WO | 92/00928 | * 1/1992 |

OTHER PUBLICATIONS

Abstract of CN 101565194A, Oct. 28, 2009.*

* cited by examiner

*Primary Examiner* — Steven J Bos
(74) *Attorney, Agent, or Firm* — Buchanan, Ingersoll & Rooney PC

(57) ABSTRACT

Particles for a monolithic refractory are made of a spinet porous sintered body which is represented by a chemical formula of $MgAl_2O_4$, wherein pores having a pore size of 0.01 μm or more and less than 0.8 μm occupy 10 vol % or more and 50 vol % or less with respect to a total volume of pores having a pore size of 10 μm or less in the particles, and the particles for a monolithic refractory have grain size distribution in which particles having a particle size of less than 45 μm occupy 60 vol % or less, particles having a particle size of 45 μm or more and less than 100 μm occupy 20 vol % or more and 60 vol % or less, and particles having a particle size of 100 μm or more and 1000 μm or less occupy 10 vol % or more and 50 vol % or less.

1 Claim, No Drawings

PARTICLES FOR MONOLITHIC REFRACTORY

BACKGROUND OF THE INVENTION

Field of the Invention

The present invention relates to particles for a monolithic refractory which are made of a spinel porous sintered body.

Description of the Related Art

As a powder material that is a raw material for a monolithic refractory, various kinds of ceramic materials are often used, and in particular, in the light of heat resistance and corrosion resistance, alumina-spinel ceramics can be exemplified as a favorable form.

For example, JP 2002-187782 A discloses an alumina-spinel monolithic refractory, which uses an alumina material with purity of 99.5% or more, or preferably with purity of 99.7% or more for reducing generation of cracks and exfoliation so as to obtain high durability. Further, a spinel material with a total content of alumina and magnesia of 99.5% or more is used so as to reduce generation of cracks and exfoliation, thereby obtaining high durability.

By the way, as a material for a heat insulating material that can suppress rising of thermal conductivity in a high temperature region of 1000° C. or more and also has superior heat resistance, a magnesia-spinel ceramic porous body which is one of the forms of the alumina-spinel ceramics has attracted an attention.

Each of JP 2012-229139 A, JP 2013-209278 A and JP 2015-000838 A discloses that a spinel ceramic porous body having predetermined pore size distribution can suppress conductive heat transfer and radiant heat transfer, and thus can be used as a heat insulating material which has superior heat resistance even at a high temperature of 1000° C. or more.

Further, the applicant of JP 2012-229139 A, JP 2013-209278 A and JP 2015-000838 A and the present invention has filed an application of an invention that relates to a new monolithic refractory (Japanese patent application 2014-153565) on Jul. 29, 2014. This application aims to provide an unconventional monolithic refractory that utilizes the excellent thermal conductivity characteristics of the spinel porous bodies described in JP 2012-229139 A, JP 2013-209278 A and JP 2015-000838 A.

Moreover, the applicant of the present invention has focused on the possibility of obtaining a structure that has an unconventionally superior thermal characteristic by combining the above-described monolithic refractory with various kinds of existing refractories. Further, the applicant feels necessity to consider not only the combination with the various kinds of refractories for exhibiting the above-described superior effect, but also a favorable form of the spinel porous body which enables the monolithic refractory itself to exhibit the superior thermal characteristic.

SUMMARY OF THE INVENTION

The present invention has been made in the light of the above-described problem, and aims to provide particles for a monolithic refractory made of spinel ceramics as raw material powder suitable for the monolithic refractory.

The particles for a monolithic refractory of the present invention are made of a spinel porous sintered body which is represented by a chemical formula of $MgAl_2O_4$, wherein pores having a pore size of 0.01 μm or more and less than 0.8 μm occupy 10 vol % or more and 50 vol % or less with respect to a total volume of pores having a pore size of 10 μm or less in the particles for a monolithic refractory, and the particles for a monolithic refractory have grain size distribution in which particles having a particle size of less than 45 μm occupy 60 vol % or less, particles having a particle size of 45 μm or more and less than 100 μm occupy 20 vol % or more and 60 vol % or less, and particles having a particle size of 100 μm or more and 1000 μm or less occupy 10 vol % or more and 50 vol % or less.

According to the structure, the particles for a monolithic refractory can provide a superior thermal characteristic to the monolithic refractory using the same.

According to the present invention, by setting a pore size and grain size distribution of a material which can maintain low thermal conductivity even in a high temperature region, that is, the above-described particles for a monolithic refractory to be most suitable for the application to various kinds of monolithic refractories, the obtained monolithic refractory can have an excellent effect of suppressing the thermal conductivity to be low even in its use at a high temperature.

DESCRIPTION OF THE EMBODIMENTS

Hereinafter, the present invention will be described in detail.

Particles for a monolithic refractory of the present invention are made of a spinel porous sintered body which is represented by a chemical formula of $MgAl_2O_4$, wherein pores having a pore size of 0.01 μm or more and less than 0.8 μm occupy 10 vol % or more and 50 vol % or less with respect to a total volume of pores having a pore size of 10 μm or less in the particles for a monolithic refractory, and the particles for a monolithic refractory have grain size distribution in which particles having a particle size of less than 45 μm occupy 60 vol % or less, particles having a particle size of 45 μm or more and less than 100 μm occupy 20 vol % or more and 60 vol % or less, and particles having a particle size of 100 mm or more and 1000 μm or less occupy 10 vol % or more and 50 vol % or less.

Firstly, the particles for a monolithic refractory of the present invention are made of assembly of spinel porous sintered bodies that are represented by a chemical formula of $MgAl_2O_4$. Since $MgAl_2O_4$ (magnesia-spinel) exhibits small change in form and size of pores that are generated by grain growth or combination of grain boundaries at a high temperature, and can maintain an effect for suppressing the change of thermal conductivity for a long period of time, it is suitable for the use at a high temperature. Incidentally, a chemical composition and a structure of $MgAl_2O_4$ (magnesia-spinel) can be measured and identified, for example, by powder X-ray diffractometry.

Then, in these particles for a monolithic refractory, pores having a pore size of 0.01 μm or more and less than 0.8 μm occupy 10 vol % or more and 50 vol % or less with respect to a total volume of pores having a pore size of 10 μm or less.

Porosity and a pore volume ratio can be obtained from pore size distribution of particles of a porous sintered body, and the pore size distribution can be measured in accordance with JIS R 1655: 2003, "Test Methods for Pore Size Distribution of Fine Ceramic Green Body by Mercury Porosimetry".

In the present invention, since the so-called micropores which have a pore size of 0.01 μm or more and less than 0.8 μm occupy 10 vol % or more and 50 vol % or less with respect to the total volume of the pores having the a pore size of 10 μm or less, the number of the pores per unit volume can be increased, so that phonon scattering frequencies at grain boundaries of the particles for a monolithic refractory can be increased, whereby an effect of suppressing the conductive heat transfer can be obtained.

If the micropores occupy less than 10 vol %, the number of the pores per unit volume is small, so that the number of the grain boundaries per unit volume is also small, whereby the effect of suppressing the conductive heat transfer cannot be sometimes obtained sufficiently. On the other hand, if the micropores occupy more than 50 vol %, the number of the pores having a pore size of 0.8 μm or more and 10 μm or less, which are suitable for suppressing radiant heat transfer, is relatively small, whereby the suppress of the radiant heat transfer may be sometimes difficult.

Incidentally, the ratio of the pores having a pore size of 0.8 μm or more and 10 μm or less with respect to the pores having a pore size of 10 μm or less is not particularly limited. The reason for this is because, since it is difficult to obtain a ratio of pores having a pore size of less than 0.01 μm by the pore size distribution measurement in accordance with JIS R 1655: 2003, "Test Methods for Pore Size Distribution of Fine Ceramic Green Body by Mercury Porosimetry.", the ratio of the pores having a pore size of 0.8 μm or more and 10 μm or less is determined uniquely from the ratio of the micropores having a pore size of 0.01 μm or more and less than 0.8 μm.

The particles for a monolithic refractory of the present invention preferably contain 40 vol % or more and 80 vol % or less of the pores having a pore size of 10 μm or less. If the content of the pores having a pore size of 10 μm or less is less than 40 vol %, an absolute amount of the micropores becomes relatively small, so that the effect of suppressing the conductive heat transfer cannot be sometimes obtained sufficiently. On the other hand, if the content of the pores having a pore size of 10 μm or less is more than 80 vol %, the porosity becomes too high so as to decrease strength of the particles significantly, thereby leading to a risk of breaking the particles at the time of molding.

Also, the ratio of coarse pores having a pore size of more than 10 μm with respect to the total volume of all the pores is not particularly limited. The reason for this is because, unlike an integrally molded article, the various kinds of monolithic refractories using the particles for a monolithic refractory of the present invention, which are constituted of the assemblies having the particle sizes in the order of micrometers, include gaps between the respective particles, and thus are not necessary to have such a strict limitation of the coarse pores. However, in the light of the strength of the monolithic refractory to be made from the particles, the ratio of such coarse pores having a pore size of more than 10 μm with respect to the total volume of all the pores is preferably 0% or more and 30% or less.

Herein, it is further preferable that tapped bulk density in the assembly of the particles for a monolithic refractory of the present invention is 0.6 g/cm$^3$ or more and 1.0 g/cm$^3$ or less. The tapped bulk density is measured with reference to JIS R 1628:1997, "Test Methods for Bulk Density of Fine Ceramic Powder".

In the state of being filled with a large number of particles, many gaps usually exist between the particles. Generally, if a ratio of large pores is high, it becomes difficult to suppress radiant heat transfer, so that it is preferable to reduce such gaps which correspond to the large pores for carrying out the present invention.

The tapped bulk density is measured while excluding gaps between the particles as much as possible. Therefore, by evaluating density of the assembly of the particles for a monolithic refractory of the present invention based on the tapped bulk density and controlling the density within an appropriate range, the excellent heat insulation property of the present invention can be secured by way of the optimization of the density.

If the tapped bulk density of the assembly of the particles for a monolithic refractory of the present invention having the above-described pore volume ratio is in the range of 0.6 g/cm$^3$ or more and 1.0 g/cm$^3$ or less, the monolithic refractory having a low occupation ratio of the coarse pores can be obtained.

If the tapped bulk density is less than 0.6 g/cm$^3$, an existence ratio of the coarse gaps becomes high, whereby it becomes slightly difficult to exhibit the excellent heat insulation property of the present invention. Further, if the tapped bulk density is more than 1.0 g/cm$^3$, the gaps between the particles become too small, so that it becomes difficult to handle the monolithic refractory at the time of application due to restriction in filling and molding of the particles for a monolithic refractory of the present invention. Thereby, it tends to be difficult for obtaining a monolithic refractory, which can be applied as a below-described castable refractory, plastic refractory or ramming material, while maintaining the effect of exhibiting the heat insulation property of the present invention.

The particles for a monolithic refractory of the present invention has the grain size distribution in which the particles having a particle size of less than 45 μm occupy 60 vol % or less, the particles having a particle size of 45 μm or more and less than 100 μm occupy 20 vol % or more and 60 vol % or less, and the particles having a particle size of 100 μm or more and 1000 μm or less occupy 10 vol % or more and 50 vol % or less. Herein, a sum of the particles having a particle size of less than 45 μm, the particles having a particle size of 45 μm or more and less than 100 μm and the particles having a particle size of 100 μm or more and 1000 μm or less is assumed to be 100 vol %.

Herein, "a particle size of x or more and less than y (x and y are arbitrary positive values, which satisfy a relation of x<y)" means that the particle does not pass through a standard sieve with a mesh size of x and passes through a standard sieve with a mesh size of y, where the standard sieves are defined in JIS Z 8801-1:2006, "Test sieves-Part 1: Test Sieves of Metal Wire Cloth".

By having both of the pore volume ratio and the ranges of the grain size distribution as specified above, a low-density and light-weight monolithic refractory having low thermal conductivity can be obtained effectively. In other words, unless the pore volume ratio and the grain size distribution are set within the appropriate ranges, such an effect cannot be obtained.

For example, the pore size distribution as specified in the present invention can be hardly obtained only from the particles of $MgAl_2O_4$ which have almost single particle size. That is, it is difficult to set the pore sizes and the pore volume ratio to be within the preferable ranges of the present invention only by the gaps between the particles.

A method for manufacturing the particles for a monolithic refractory of the present invention is not particularly limited, and a known method for manufacturing a porous sintered body can be adopted. A pore structure can be formed and adjusted by adding a pore-forming agent or a foaming agent, or the like. Further, a particle size is adjusted according to a crushing condition and a sieving condition of the porous sintered body. The pore-forming agent may be, for example, particles made of acrylic resin, and the foaming agent may be, for example, a surfactant. Moreover, an existence ratio between particles having large particle sizes and particles having small particle sizes can adjust the porosity of the monolithic refractory. By modifying the manufacturing conditions appropriately based on such information, the desired particles for a monolithic refractory can be obtained.

Several examples of monolithic refractories using the particles for a monolithic refractory of the present invention are as follows. One of the preferable forms is a castable refractory which contains at least 30 wt. %, and more preferably, 50 wt. % to 70 wt. % of the particles for a monolithic refractory of the present invention per unit weight.

A purpose of using the castable refractory is not particularly limited, but for utilizing the above-described excellent thermal characteristic of the particles for a monolithic refractory of the present invention, the castable refractory is particularly favorably used for a purpose of suppressing heat loss at a high temperature of 1000° C. or more. One example of such a purpose is protection of internal and external surfaces of a tip portion of an immersion nozzle for steel.

Further, in order to exhibit the excellent thermal characteristic significantly, the castable refractory preferably contains at least 30 wt. % of the particles for a monolithic refractory of the present invention per unit weight. Incidentally, an upper limit of the content of the particles for a monolithic refractory of the present invention can be set appropriately according to a purpose and a state of its use, but the content is preferably 80 wt. % or less, because, if it is more than 80 wt. %, a larger amount of water becomes required for adding flowability that is necessary for the castable refractory as a monolithic material during its formation, so that the castable refractory becomes difficult to be dealt as a monolithic refractory; for example, a longer period of time is required for drying, and its shrinkage becomes large during the drying process so as to cause generation of cracks more likely.

Moreover, another form of the monolithic refractory is a plastic refractory or a ramming material, which contains at least 30 wt. %, and more preferably contains 40 wt. % to 60 wt. % of the particles for a monolithic refractory of the present invention per unit weight.

Herein, the content of the particles for a monolithic refractory of the present invention in the plastic refractory or the ramming material is set to be 30% because of the same reason as the case of the castable refractory, and an upper limit of the content can also be set appropriately according to a purpose and a state of its use, but the content is preferably 70% or less, because the plastic refractory or the ramming material becomes difficult to be dealt as a monolithic material, if it is more than 70%.

By setting the content of the particles for a monolithic refractory appropriately according to its purpose as described above, the most suitable characteristics and usability for the purpose can be obtained. Incidentally, in the present invention, also to the materials other than the particles for a monolithic refractory, known materials can be similarly adopted according to the purpose at an appropriate time.

Incidentally, the above-described content of the particles for a monolithic refractory is just a preferable example, and a range thereof can be varied according to the purpose. For example, in the case where a long period of drying time and generation of cracks are allowed for the castable refractory, or in the case where drying cracks are not likely to be generated because a heat-insulating layer is thin, it is possible to use more than 80 wt. % of the particles for a monolithic refractory of the present invention with an appropriately selected binder, or in some cases, a layer made only of the particles for a monolithic refractory of the present invention may be formed.

Moreover, the particles for a monolithic refractory of the present invention may be mixed uniformly all over the monolithic refractory, or may be partly localized along a plane direction or a thickness direction. Alternatively, a layer made only of the particles for a monolithic refractory of the present invention may be newly provided on another refractory.

Incidentally, for example, when manufacturing a castable refractory, clay mineral is generally added for the purpose of providing flowability that is suitable for the formation. However, since such clay mineral contains Si as a main component, if the monolithic refractory of the present invention contains 15 wt. % or more of Si, the particles for the monolithic refractory of the present invention causes a chemical reaction with Si when it is used at a high temperature, so that cracks may be generated due to shrinkage of the monolithic refractory or the above-described micropores may be decreased so as to degrade its heat insulation effect. Thus, the use of such a material containing Si should be avoided, or only a minimum amount thereof can be used.

The monolithic refractory using the particles for a monolithic refractory of the present invention can be modified variously, unless an adverse effect such as significant deterioration of the heat insulation effect is caused. For example, on a surface or inside of a castable refractory, a plastic refractory or a ramming material, a layer made of the particles for a monolithic refractory of the present invention may be formed. In this case, in order to obtain a high heat insulation property, the layer may have a thickness of at least 3 mm or more, and preferably of 5 mm or more.

The above-described monolithic refractory according to the present invention preferably has thermal conductivity at a room temperature, which ranges from 0.3 W/mK to 1.0 W/mK, and thermal conductivity in a high temperature range of 1000° C. or more and 1500° C. or less, which is 1.0 W/mK or less. Such a monolithic refractory with the suppressed increase of the thermal conductivity in a high temperature range of 1000° C. or more exhibits small change in heat insulation effect even in the use in the high temperature range. Incidentally, the thermal conductivity at 1000° C. or more and 1500° C. or less is more preferably 0.7 W/mK or less. In order to obtain such low thermal conductivity at high temperature, the content of the particles for a monolithic refractory of the present invention is adjusted so that the monolithic refractory may contain 25 vol % or more of the pores having a pore size of 0.8 μm or more and 10 μm or less.

The monolithic refractory may contain other material, for example, an aggregate made of alumina particles or the like, or an additive such as hollow alumina particles and inorganic fiber, unless the effect of the present invention is lost. The thermal characteristic of the monolithic refractory containing such materials is actually inferior to the excellent thermal characteristic of the particles for a monolithic refractory of the present invention. Nevertheless, compared to the various kinds of the conventional monolithic refractories which have been used in similar forms, the monolithic refractory according to the present invention exhibits such low thermal conductivity characteristic at a high temperature as described above, which has been hardly attained conventionally.

Therefore, the monolithic refractory of the present invention exhibits the favorable effect in the case where a superior heat insulation property to that of the conventional monolithic refractories is required, only a small space is provided for the monolithic refractory, weight saving of the monolithic refractory is sought, and the like.

EXAMPLES

Hereinafter, the present invention will be described by way of examples, but the present invention is not limited to the examples described below.
[Production of Particles for Monolithic Refractory]

Examples 1 to 6 and Comparative Examples 1 to 3

11 mol of hydraulic alumina powder (BK-112; produced by Sumitomo Chemical Co., Ltd.) and 9 mol of magnesium oxide powder (MGO11PB; produced by Kojundo Chemical Laboratory Co., Ltd.) were mixed in this ratio, and pure water was added thereto so that the mixed powder might be dispersed uniformly, thereby preparing slurry. Then, a pore-forming agent was mixed with the slurry so that a concentration thereof might be within a range from 0 vol % to 50 vol %, and the mixture was molded and dried, and then fired in the atmosphere at 1600° C. for 3 hours, thereby obtaining respective porous sintered bodies.

As shown respectively in Examples 1 to 6 and Comparative Examples 1 to 3 in Table 1 below, each of pore structures was adjusted by appropriately changing: an adding amount of the pure water during the preparation of the slurry; and a diameter, an adding amount and the like of acrylic resin particles that were used as a pore-forming agent.

Each of the porous sintered bodies was milled by a commercially available mill, and a particle existence ratio (vol %) according to the particle size was adjusted by changing a milling condition at an appropriate time, thereby producing particles for a monolithic refractory with grain size distribution shown in Table 1.

Herein, crystal phases of the above obtained respective porous sintered bodies were identified by X-ray diffraction (X-ray source: CuKα, voltage: 40 kV, current: 0.3 A, scan rate: 0.06°/s), and magnesia spinel phases were observed in all of the crystal phases.

The obtained products of Examples 1 to 6 and Comparative Examples 1 to 3 were respectively subjected to measurement of pore volume by using a mercury porosimeter (JIS R 1655:2003) and measurement of tapped bulk density (JIS R 1628:1997), and these respective evaluation results will be shown collectively in Table 1.

Herein, since it was difficult to evaluate thermal conductivity of the particles, thermal conductivity of the single material of the particles produced in Examples 1 to 6 and Comparative Examples 1 to 3 were not evaluated, and below-described castable refractories were produced to be evaluated.
[Production of Castable Refractory]

Examples $1_a$ to $6_a$ 60 wt. % of the particles of each of Examples 1 to 6, 25 wt. % of hollow alumina particles having particle sizes of 1 mm to 5 mm, 15 wt. % of alumina cement, a very small amount of sodium hexametaphosphate as a dispersant were mixed with water, and the mixture was molded by cast-molding into a shape of 200 mm×100 mm×50 mm. The obtained molded body was dried at 110° C. for 20 hours so as to obtain a dried body. The dried body was fired in the atmosphere at 1550° C. for 3 hours, thereby obtaining a castable refractory of each of Examples $1_a$ to $6_a$.

Comparative Examples $1_a$ to $3_a$

Then, 60 wt. % of the particles of each of Comparative Examples 1 to 3, 25 wt. % of hollow alumina particles having particle sizes of 1 mm to 5 mm, 15 wt. % of alumina cement, a very small amount of sodium hexametaphosphate as a dispersant were mixed with water, and the mixture was molded by cast-molding into a shape of 200 mm×100 mm×50 mm. The obtained molded body was dried at 110° C. for 20 hours so as to obtain a dried body. The dried body was fired in the atmosphere at 1550° C. for 3 hours, thereby obtaining a castable refractory of each of Comparative Examples $1_a$ to $3_a$.

Example 7 and Comparative Example 4

Further, 30 wt. % of commercially available heat-insulating castable powder which contained 85 wt. % of alumina and 5 wt. % of silica, and 70 wt. % of the particles of Example 1 were subjected to dry blending, and then, water was added thereto. The blended product was stirred by a mixer until it became uniform, and the mixture was molded by cast-molding into a shape of 200 mm×100 mm×50 mm. The obtained molded body was dried at 110° C. for 20 hours so as to obtain a dried body. The dried body was fired in the atmosphere at 1550° C. for 3 hours, thereby obtaining a castable refractory of Example 7.

Moreover, water was added to a commercially available heat-insulating castable powder which contained 85 wt. % of alumina and 5 wt. % of silica, and was stirred by a mixer to be uniform. The mixture was molded by cast-molding into a shape of 200 mm×100 mm×50 mm. The obtained molded body was dried at 110° C. for 20 hours so as to obtain a dried body. The dried body was fired in the atmosphere at 1550° C. for 3 hours, thereby obtaining a castable refractory of Comparative Example 4.

Thermal conductivity of the respective monolithic refractories of Examples $1_a$ to $6_a$, Comparative Examples $1_a$ to $3_a$, Example 7 and Comparative Example 4 were measured with reference to JIS R 2616:2001, "Testing Method For Thermal Conductivity Of Insulating Fire Bricks". These results will be also shown in Table 1.

TABLE 1

| | Ratio of pore volume with pore size of 10 μm or less [A] (vol %) | Ratio of pore volume with pore size of 0.01 μm or more and less than 0.8 μm with respect to [A] (vol %) | Particle existence ratio according to particle size (vol %) | | | Tapped bulk density (g/cm³) | Thermal conductivity (W/mK) | |
|---|---|---|---|---|---|---|---|---|
| | | | Less than 45 μm | 45 μm or more and less than 100 μm | 100 μm or more and 1000 μm or less | | at 1000° C. | at 1500° C. |
| Example 1 | 56 | 30 | 48 | 32 | 20 | 0.71 | — | — |
| Example 1$_a$ | — | — | — | — | — | — | 0.4 | 0.6 |
| Example 2 | 53 | 30 | 23 | 48 | 26 | 0.66 | — | — |
| Example 2$_a$ | — | — | — | — | — | — | 0.4 | 0.8 |
| Example 3 | 52 | 30 | 2 | 54 | 44 | 0.62 | — | — |
| Example 3$_a$ | — | — | — | — | — | — | 0.5 | 1 |
| Example 4 | 59 | 30 | 58 | 23 | 14 | 0.7 | — | — |
| Example 4$_a$ | — | — | — | — | — | — | 0.3 | 0.7 |
| Example 5 | 43 | 12 | 45 | 33 | 21 | 0.94 | — | — |
| Example 5$_a$ | — | — | — | — | — | — | 0.7 | 0.8 |
| Example 6 | 72 | 47 | 25 | 44 | 28 | 0.62 | — | — |
| Example 6$_a$ | — | — | — | — | — | — | 0.4 | 0.9 |
| Example 7 | — | — | — | — | — | — | 0.5 | 0.9 |
| Comparative Example 1 | 40 | 7 | 50 | 31 | 19 | 1.03 | — | — |
| Comparative Example 1$_a$ | — | — | — | — | — | — | 1.5 | 1.2 |
| Comparative Example 2 | 79 | 54 | 52 | 35 | 12 | 0.67 | — | — |
| Comparative Example 2$_a$ | — | — | — | — | — | — | 0.6 | 1.4 |
| Comparative Example 3 | 51 | 30 | 10 | 37 | 53 | 0.56 | — | — |
| Comparative Example 3$_a$ | — | — | — | — | — | — | 0.7 | 1.2 |
| Comparative Example 4 | — | — | — | — | — | — | 1.5 | 2.4 |

As is obvious from Table 1, the monolithic refractories of Examples 1$_a$ to 6$_a$ and Example 7 exhibited the lower thermal conductivity at a heated temperature of 1000° C. or more and the lower temperature dependence of the thermal conductivity than those of Comparative Examples 1$_a$ to 3$_a$ and Comparative Example 4. In particular, while the thermal conductivity at 1500° C. of Examples 1$_a$ to 6$_a$ and 7 was 1 W/mK or less, that of Comparative Examples 1$_a$ to 3$_a$ and 4 was more than 1 W/mK, respectively. From these results, the product using the particles for a monolithic refractory within the scope of the present invention can have the lower thermal conductivity at 1000° C. or more than that of the conventional refractories.

In particular, there was a large difference in thermal conductivity between the monolithic refractory of Example 7 which contains the particles for a monolithic refractory of the present invention and the monolithic refractory of Comparative Example 4 which does not contain the particles for a monolithic refractory of the present invention, thereby showing the effect of the particles for a monolithic refractory of the present invention most significantly.

What is claimed is:

1. Particles for a monolithic refractory, said particles comprising spinel porous sintered bodies represented by a chemical formula of $MgAl_2O_4$,
    wherein pores having a pore size of 0.01 μm to less than 0.8 μm occupy 10 vol % to 50 vol % with respect to a total volume of pores having a pore size of 10 μm or less in the particles for a monolithic refractory, and
    the particles for a monolithic refractory have grain size distribution in which particles having a particle size of less than 45 μm occupy 60 vol % or less, particles having a particle size of 45 μm to less than 100 μm occupy 20 vol % to 60 vol %, and particles having a particle size of 100 μm to 1000 μm occupy 10 vol % to or more and 50 vol %.

* * * * *